(12) United States Patent
Lewin (10) Patent No.: US 9,292,101 B2
(45) Date of Patent: Mar. 22, 2016

(54) METHOD AND APPARATUS FOR USING PERSISTENT DIRECTIONAL GESTURES FOR LOCALIZATION INPUT

(71) Applicant: Research In Motion Limited, Waterloo (CA)

(72) Inventor: Mathias Lewin, Rydebäck (SE)

(73) Assignee: BlackBerry Limited, Waterloo, Ontario (CA)

( * ) Notice: Subject to any disclaimer, the term of this patent is extended or adjusted under 35 U.S.C. 154(b) by 228 days.

(21) Appl. No.: 13/761,682

(22) Filed: Feb. 7, 2013

(65) Prior Publication Data

US 2014/0223365 A1 Aug. 7, 2014

(51) Int. Cl.
G06F 3/0482 (2013.01)
G06F 3/023 (2006.01)
G06F 3/0488 (2013.01)
G06F 3/0484 (2013.01)

(52) U.S. Cl.
CPC .......... *G06F 3/0237* (2013.01); *G06F 3/04842* (2013.01); *G06F 3/04883* (2013.01)

(58) Field of Classification Search
USPC ........................................................ 715/810
See application file for complete search history.

(56) References Cited

U.S. PATENT DOCUMENTS

| | | | |
|---|---|---|---|
| 6,286,064 B1 | 9/2001 | King et al. | |
| 7,098,896 B2 | 8/2006 | Kushler et al. | |
| 8,296,680 B2 | 10/2012 | Griffin et al. | |
| 2004/0140956 A1 | 7/2004 | Kushler et al. | |
| 2006/0053387 A1 | 3/2006 | Ording | |
| 2007/0040813 A1 | 2/2007 | Kushler et al. | |
| 2007/0061753 A1 | 3/2007 | Ng et al. | |
| 2007/0174788 A1 | 7/2007 | Ording | |
| 2007/0256026 A1 | 11/2007 | Klassen et al. | |
| 2008/0115072 A1* | 5/2008 | Lu | 715/765 |
| 2009/0058823 A1 | 3/2009 | Kocienda | |
| 2010/0180235 A1* | 7/2010 | Griffin et al. | 715/841 |
| 2011/0037775 A1 | 2/2011 | Park et al. | |
| 2012/0028687 A1 | 2/2012 | Wykes et al. | |
| 2012/0113008 A1 | 5/2012 | Makinen et al. | |
| 2012/0146955 A1 | 6/2012 | Martin-Cocher et al. | |

OTHER PUBLICATIONS

Extended European Search Report from the European Patent Office for corresponding EP Application No. 13154431.4, dated Jul. 1, 2013 (6 pages).

* cited by examiner

*Primary Examiner* — Peiyong Weng
(74) *Attorney, Agent, or Firm* — Fish & Richardson P.C.

(57) ABSTRACT

Methods and apparatuses are provided for entering characters into an electronic device. As part of a device configuration process, languages and associated character sets are stored in the electronic device. Responsive to user input as part of a device operation process, the electronic device presents a menu of language character sets for selection, with the language character sets assigned to particular positions within the menu. In response to the selected language character set, the electronic device presents a menu of language variant characters for selection, with the language variant characters assigned to particular positions within the menu. In response to selection of a language variant character, the electronic device displays the character within the display window.

20 Claims, 11 Drawing Sheets

METHOD AND APPARATUS FOR USING PERSISTENT DIRECTIONAL GESTURES FOR LOCALIZATION INPUT

FIELD

This application generally relates to input methodologies for electronic devices, such as handheld electronic devices, and more particularly, to methods for inputting characters from various languages.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message. This input can be complicated further if variants of characters from different language alphabets must be entered.

Accordingly, methods and apparatuses are provided to assist users in entering different language variants of characters.

DETAILED DESCRIPTION

Reference will now be made in detail to the disclosed example embodiments, examples of which are illustrated in the accompanying drawings. Wherever possible, the same reference numbers will be used throughout the drawings to refer to the same or like parts.

The present disclosure relates to an electronic device, including wired communication devices (for example, a laptop computer having a touchscreen) and mobile or handheld wireless communication devices such as cellular phones, smartphones, wireless organizers, personal digital assistants, wirelessly enabled notebook computers, tablets, and similar devices. The electronic device can also be an electronic device without wireless communication capabilities, such as a handheld electronic game device, digital photograph album, digital camera, or other device. The electronic device includes a keyboard for purposes of character entry and operation in various contexts.

Basic solutions exist for the input of non-keyboard-assigned characters, such as international and language variant characters including diacritics, accented characters, and currency symbols. However, on a reduced size keyboard common in electronic devices, input of these characters is cumbersome and slows down the overall input method. Users generally must look carefully at selection candidates and make a high precision selection of that character only, with no spatial navigational paradigm applied to the candidate list.

Accordingly, example embodiments described herein permit a user of an electronic device to input language variant characters more quickly and accurately. Example embodiments described herein assist with character selection by increasing the size of the selection area of the touchscreen, and thus, the accuracy of a given selection. Furthermore, by applying a directional paradigm to the selection process, speed and ease of use are enhanced.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the", or "said," particularly after a feature has been introduced with the indefinite article, is meant to include one or more than one of the feature to which it refers (unless otherwise indicated). For example, the term "the generated set of characters" as used in "displaying the generated set of characters" includes displaying one or more generated set of characters. Directional references to graphical user interface (GUI) elements, such as top and bottom, are intended to be relative to a current screen orientation (which may change) rather than any physical orientation of the host device.

In one embodiment, a method is disclosed for inputting characters in a mobile communication device having a display, a keyboard, and a memory. The method includes receiving an input character, and displaying available language variant characters associated with the input character at a position in a menu determined from a persistent association between a plurality of available language character sets and positions on the menu. Additionally, the method includes outputting, in response to an input reflecting a directional swipe toward the position of a particular one of the language variant characters on the menu, the particular language variant character as a selected character.

In another embodiment, a mobile communication device having a display and a keyboard is disclosed, comprising a memory containing a plurality of character sets associated with languages, each language character set having an associated set of language variant characters, and a set of instructions. The mobile communication device further comprises a set of instructions, and one or more processors configured to execute the instructions. The one or more processors are configured to execute the instructions to receive an input character, and display available language variant characters associated with the input character at a position in a menu determined from a persistent association between a plurality of available language character sets and positions on the menu. Additionally, the one or more processors of the mobile communication device are configured to execute the instructions to output, in response to an input reflecting a directional swipe toward the position of a particular one of the language variant characters on the menu, the particular language variant character as a selected character.

Figure 1:
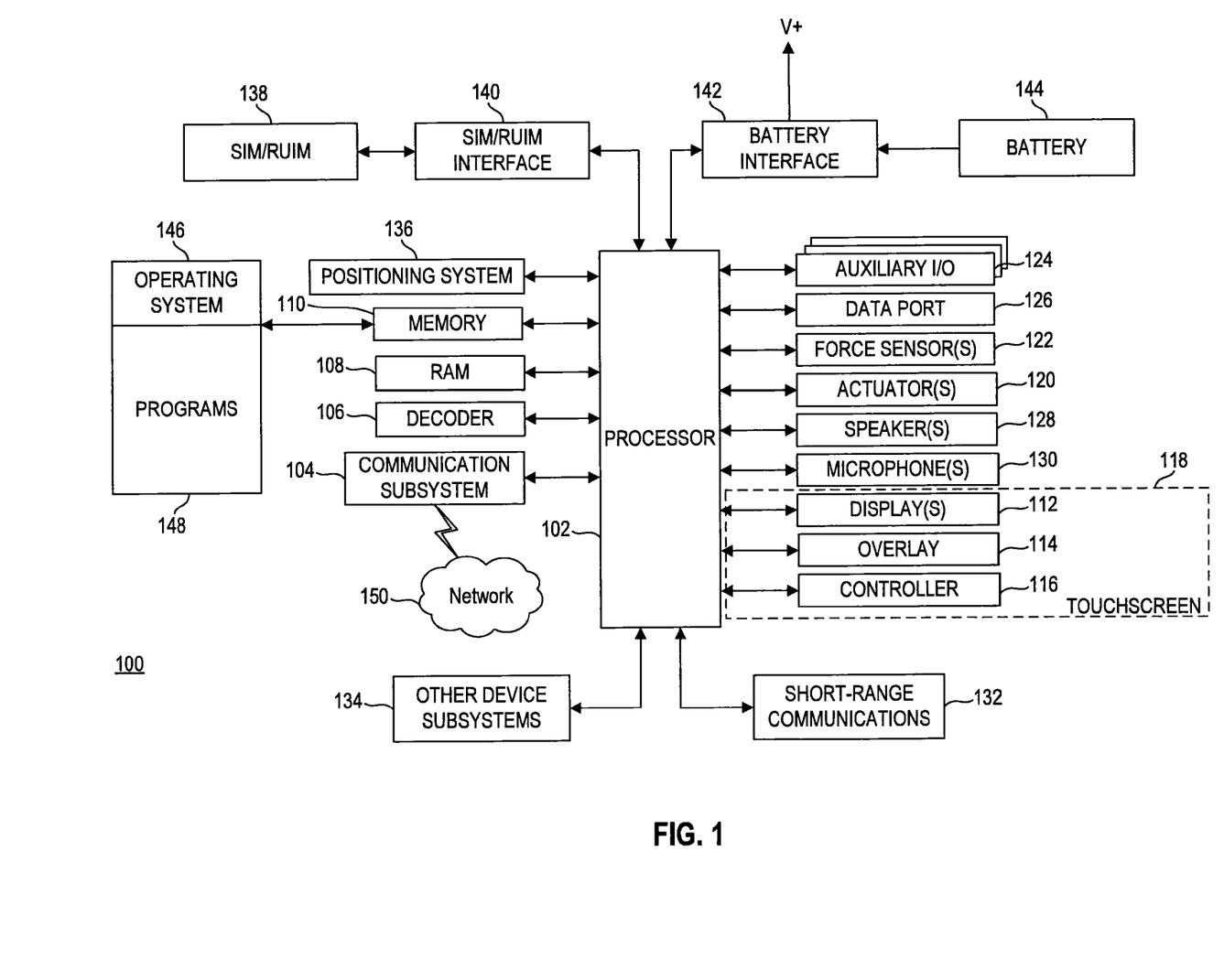
FIG. 1 is an example block diagram of an electronic device, consistent with embodiments disclosed herein.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters may be inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen are described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2A:
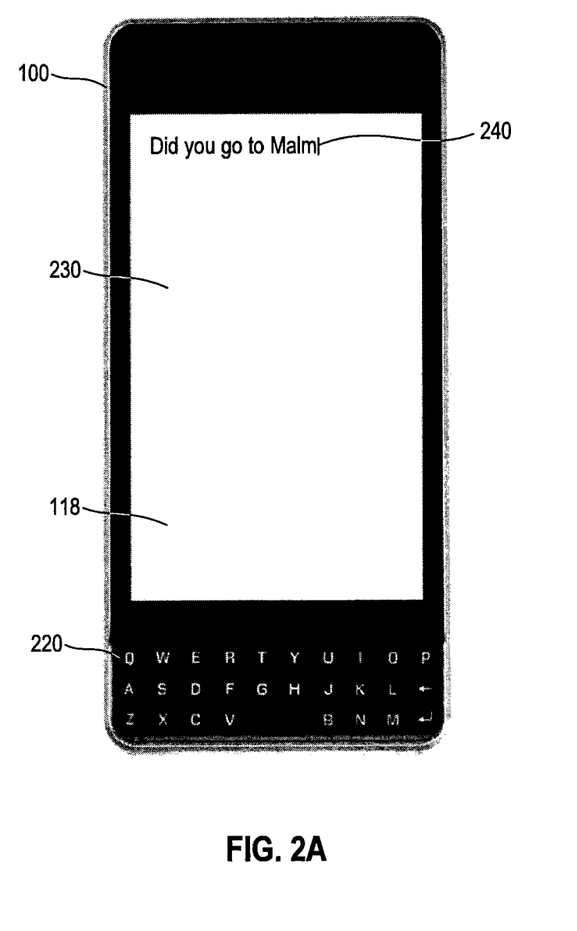
FIGS. 2A-2G and 3A-3G show examples of an electronic device, consistent with embodiments disclosed herein.

FIGS. 2A-2G and 3A-3G illustrate a series of examples of electronic device 100, consistent with example embodiments disclosed herein. Reference is first made to FIG. 2A, which illustrates a touchscreen 118 displaying a keyboard 220. In the presently described embodiment, the keyboard 220 is a virtual keyboard rendered as a GUI displayed on touchscreen 118. In other example embodiments, keyboard 220 is a virtual keyboard that can be displayed at various places on touchscreen 118. Accordingly, keyboard 220 is movable within the touchscreen 118. Keyboard 220 may alternatively be a physical keyboard, comprising a series of plastic or metal key covers overlaid on top of physical or electronic dome switches. In yet another example embodiment, keyboard 220 may be a capacitive physical keyboard comprising capacitive sensors, such as force sensors 122, arranged within or underneath the keys for purposes of force and gesture recognition.

The touchscreen 118 may be configured to detect the location as well as the pressure of one or more objects at the same time. The touchscreen 118 includes two input areas: (1) the keyboard 220, which includes a plurality of keys, each key corresponding to one or more different characters of a plurality of characters; and (2) a viewing pane 230 which displays a predetermined amount of text from a document under composition. In the example, the keyboard 220 is located below the viewing pane 230. Other locations for the input areas 220 and 230 are possible. For example, the keyboard 220 could be located at the top of the touchscreen 118, and the viewing pane 230 could be located below the keyboard 220. In yet other examples, the viewing pane 230 could be omitted.

The amount of text in viewing pane 230 from the document under composition may be limited to a predetermined number of lines of text, for example, 10 lines. The document under composition may be any type of document for any application which supports the keyboard 220, such as an email or other messaging application.

As shown in FIG. 2A, keyboard 220 is a standard QWERTY keyboard layout; however, any conventional keyboard layout can be displayed for use in the device, such as AZERTY, QWERTZ, or a layout based on the International Telecommunication Union (ITU) standard (ITU E.161) having "ABC" on key 2, "DEF" on key 3, and so on. Keyboard 220 includes various keys that can provide different inputs, such as punctuation, letters, numbers, enter or return keys, and function keys. While keyboard 220 is shown as having a square shape, it can have any other shape (such as an oval).

As shown in FIG. 2A, the touchscreen 118 displays the cursor 240, which displays characters in response to input in the keyboard 220. In the example embodiment illustrated in FIG. 2A, the user is inputting text via keyboard 220, and reaches a point where a language variant character is desired. In the example, the user wishes to input the Swedish city of "Malmö", which contains an accented language variant character, the character ö in the Swedish language.

Figure 2B:
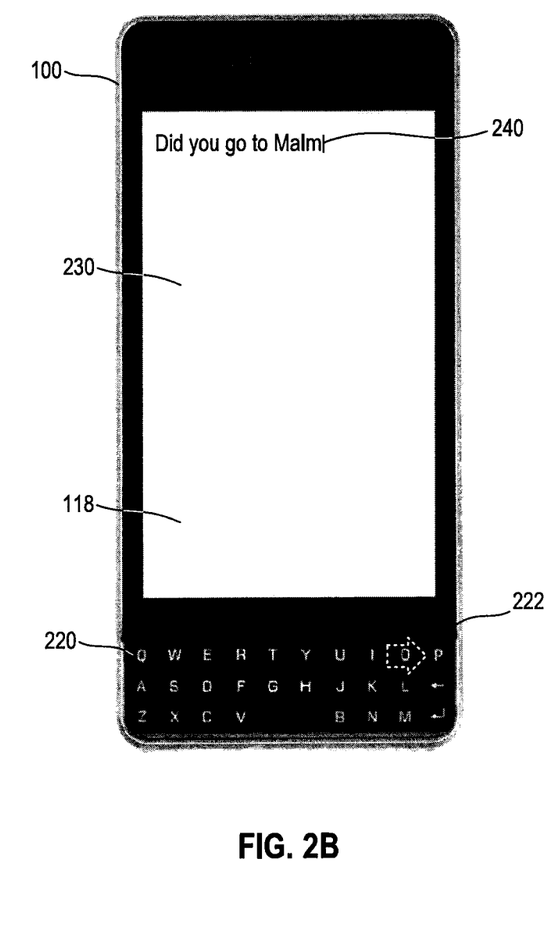

FIG. 2B illustrates the user initiating a language variant character entry module. The language variant character entry module may comprise one or more of the programs 148 loaded into operating system 146 via memory 110. In the example shown, the user achieves initiation of the language variant character entry module by a directional gesture 222 on the "base" character, in this case the letter "o" on keyboard 220, to access accented character "ö." The user may initiate the language variant character entry module in any number of ways, such as a tap on the "base" key, a press-and-hold, a double tap, etc. In some embodiments, the module may be accessed through a menu overlay. In some embodiments, the module may be accessed through alternative means, such as voice direction. In some embodiments, the module may be accessed via positioning system 136, such as through a shake, tilt, or likewise motion of electronic device 100.

Alternatively, keyboard 220 may be a physical keyboard configured in a manner to permit gesture input to assist with the character input process and the initiation of the language variant character entry module, for example, a capacitive touch keyboard. This may include an array of force sensors 122 located underneath keyboard 220 and associated with the plurality of keys of keyboard 220 that can detect gesture input.

Figure 2C:
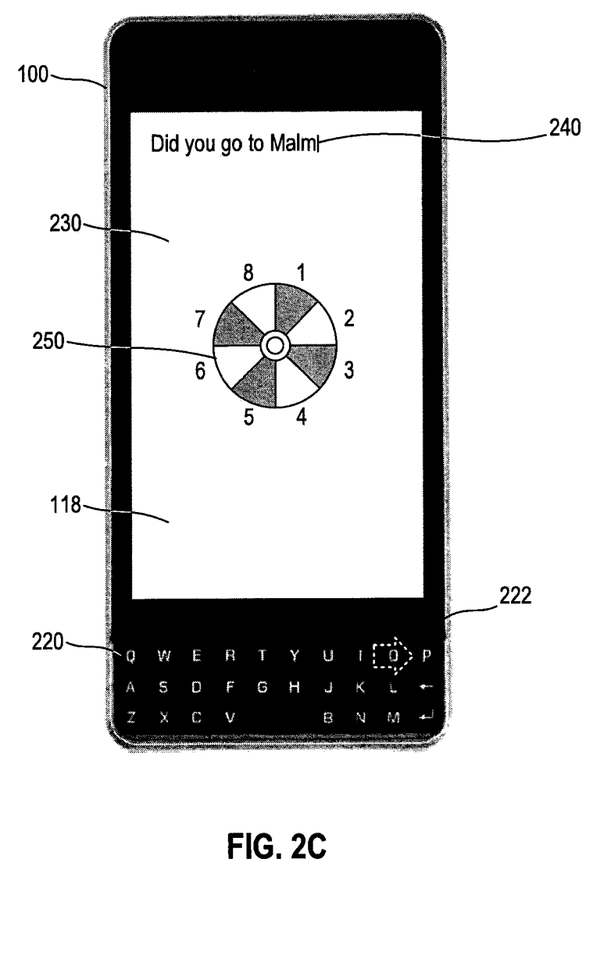

Referring to FIG. 2C, the user has initiated the language variant character entry module. Menu 250 appears on touchscreen 118 allowing further selection by the user. In the example embodiment of FIG. 2C, menu 250 is a circular or pie shaped menu overlay, however, in other embodiments, menu 250 may take on a variety of shapes, sizes, and locations within touchscreen 118. For example, menu 250 may be rectangular, hexagonal, octagonal, quadrilateral, or triangular. The various segments of menu 250 depict languages. The available language character sets may be visually presented to the user in a variety of ways. In some embodiments, the available language character sets may be represented to the user as numerical selections, which the user will associate with pre-defined language character set selections. In some embodiments, the available language character sets may be represented to the user as their full names, for example, "Swedish," "Spanish," "German," etc. In some embodiments, the available language character sets may be represented to the user as abbreviations. The abbreviations may represent the language itself, or may, for example, represent a country or geographical region associated with the language. For example, "Swedish" might be abbreviated "SWE." In some embodiments, the abbreviation may represent a country or geographical region associated with the language. For example, a selection option for Portuguese in some embodiments could alternatively be represented as "POR" for Portugal/Portuguese, or as "BRA" for Brazil.

In other embodiments, the available language character sets may be represented to the user by graphical means through the graphical user interface, such as a national flag associated with a country associated with the language. This embodiment would also permit variations of language character sets for different dialects or versions of a different language. For example, an American flag and a British flag might be displayed to both represent different character sets associated with the English language. In another embodiment, for example, flags for Mexico and Spain could be presented to both represent different character sets associated with the Spanish language.

The language character sets associated with the particular positions of menu 250 are permanently assigned to those positions through a configuration process. The language character sets will always be displayed in the same place, thus allowing users to develop speed and consistency in character entry over time. Additionally, electronic device 100 may detect the current language character set after the first input of language variant characters from that character set, and subsequently default to presentation of that language character set for future character entry. Detection of the current language character set can be based on selection of one of more language variant characters in that language character set as described herein.

Figure 2D:
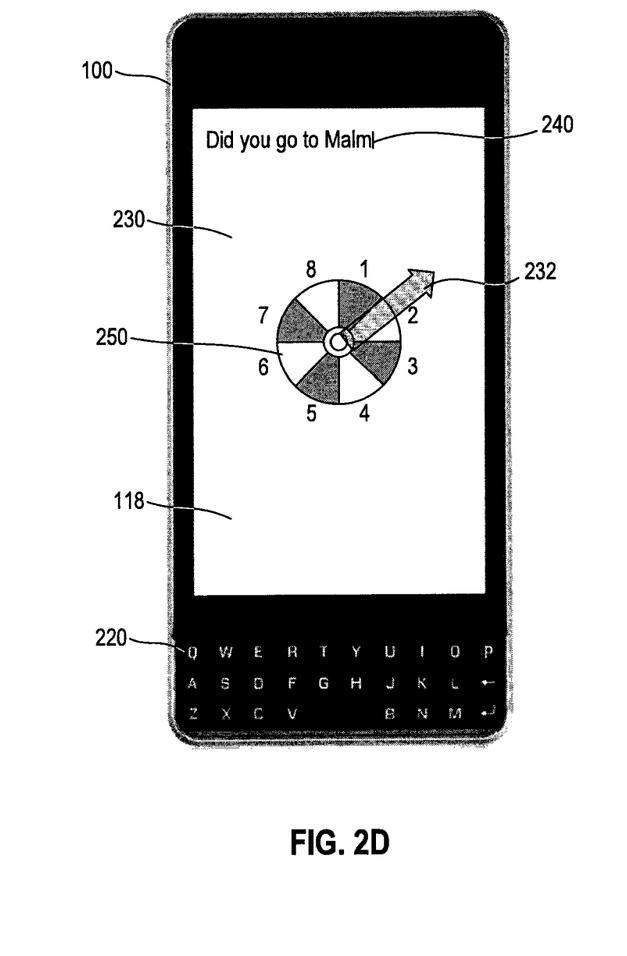

In FIGS. 2C-2D, the user desires to input a Swedish language variant character. FIGS. 2C-2D depict the Swedish language as being associated with position "2" on menu 250. To select the desired language, the user performs a directional swipe gesture 232, as shown in FIG. 2D, where the user swipes towards menu option 2 to select the desired language, Swedish. In some embodiments, the user may select the language with different gestures, for example, a tap on the desired segment of menu 250 as displayed on touchscreen 118. In some embodiments, the user may select the language with a press-and-drag gesture. In some embodiments, the user may press the desired segment of menu 250 as displayed on touchscreen 118.

Figure 2E:
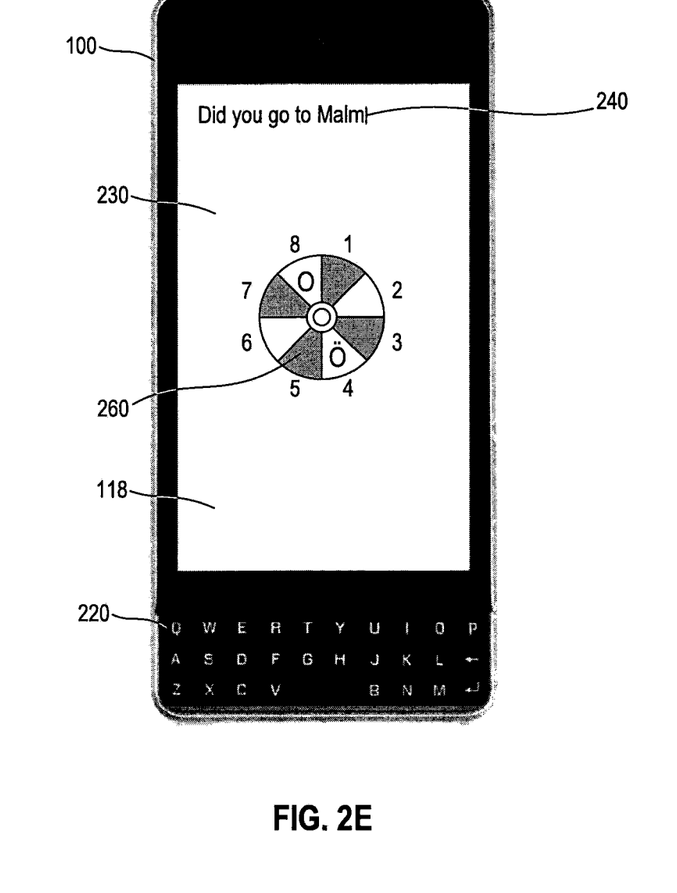

In FIG. 2E, menu 260 is displayed on touchscreen 118 presenting the language variant selection candidates associated with the chosen language. In the embodiment shown in FIG. 2E, the user has previously selected the Swedish language on menu 250, and thus menu 260 presents different language variant selection candidates for the character "o" that are associated with the Swedish language.

Much as with menu 250 and various pre-assigned language character sets, language variant characters that are selection candidates are permanently assigned to particular positions on menu 260. Consistency in character presentation again permits the user to develop speed and accuracy in character entry. In the example embodiment shown in FIGS. 2E-2F, for instance, the character "o" is assigned to position 8, and the language variant character "ö" is assigned to position 4. As before, any and all characters can be permanently assigned to any and all positions associated with menu 260.

Figure 2F:
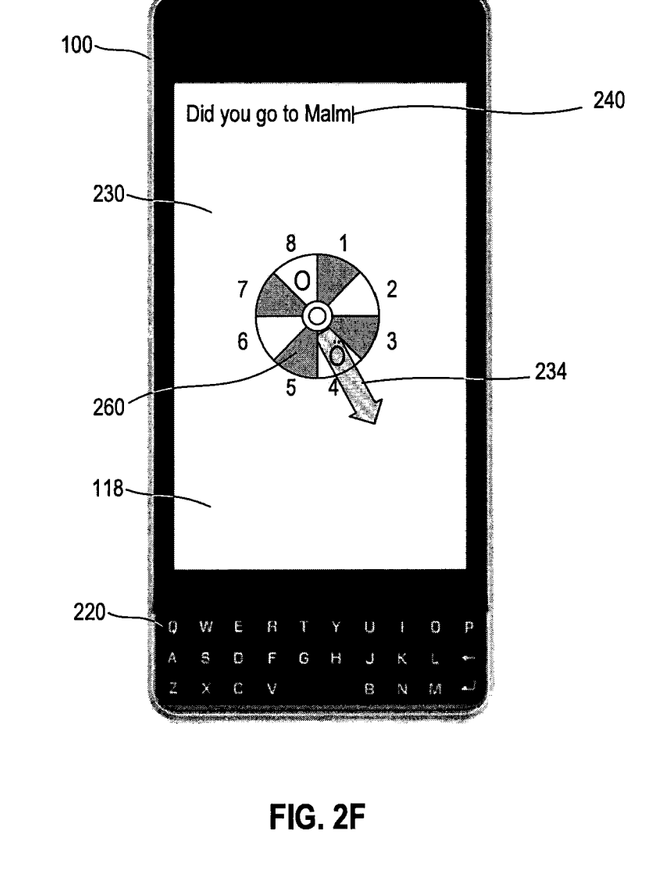
Figure 2G:
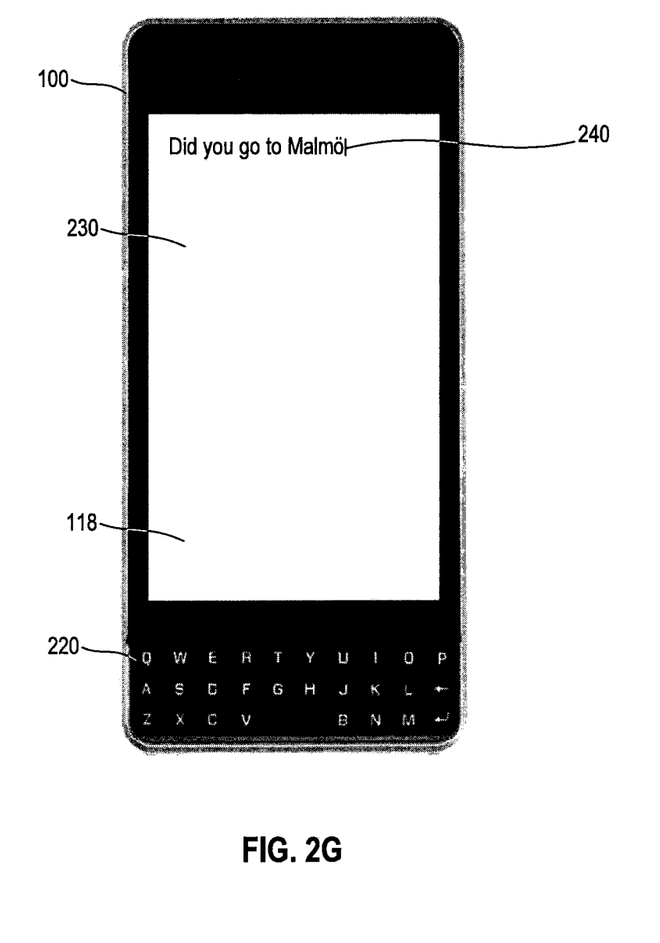

Since the user desires to input the language variant character "ö" to complete the Swedish city "Malmö," the user makes a directional swipe gesture 234 towards position 4 of menu 260 in FIG. 2F. Electronic device 100 is configured, through a process described later, to recognize that the user thus desires to input the language variant character "ö" into the text being entered into viewing pane 230 of touchscreen 118. In FIG. 2G, the character is displayed on the screen in the word, adjacent to cursor 240. Menus 250 and 260 disappear from the display, and normal text entry may resume.

The user may re-enter the language variant character entry module at any time during text entry. FIGS. 3A-3G illustrate another example embodiment of the disclosure similar to that shown in FIGS. 2A-2G.

Figure 3A:
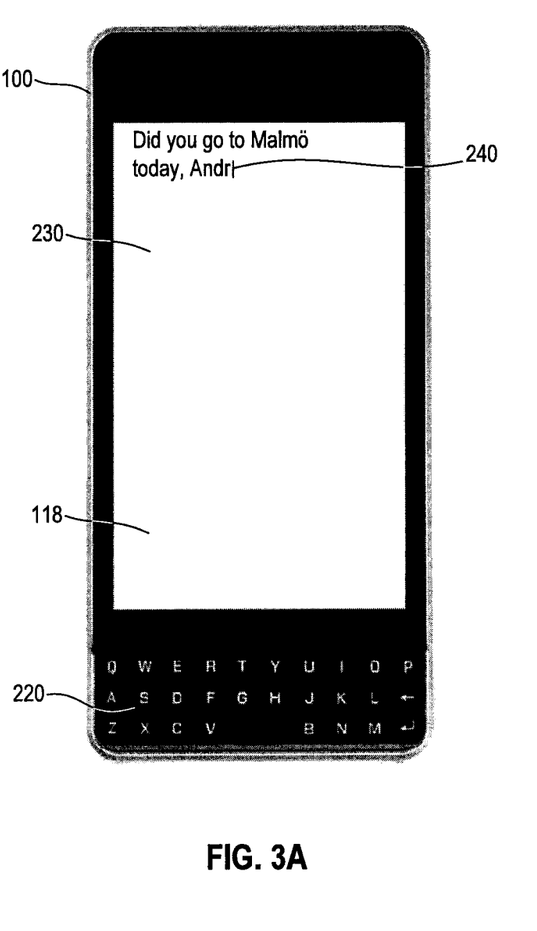
Figure 3B:
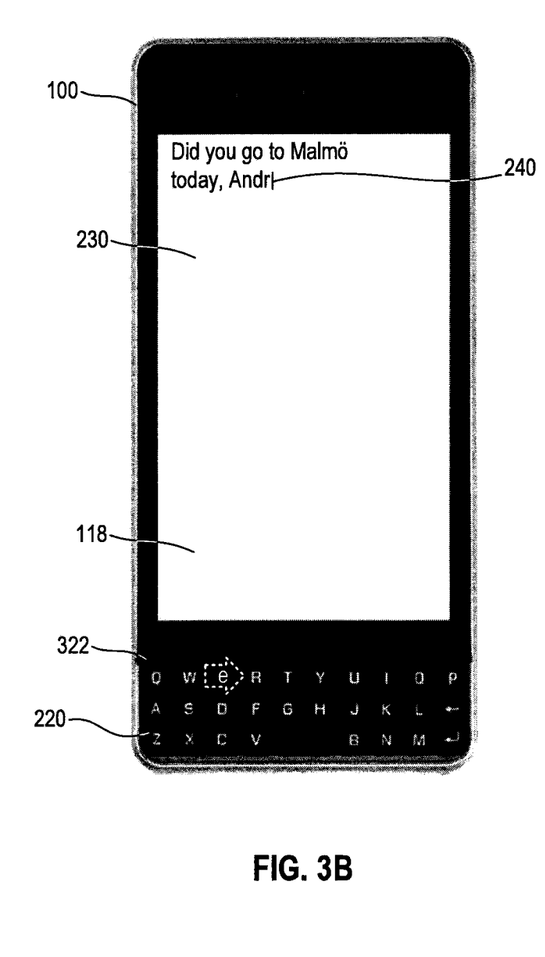
Figure 3C:
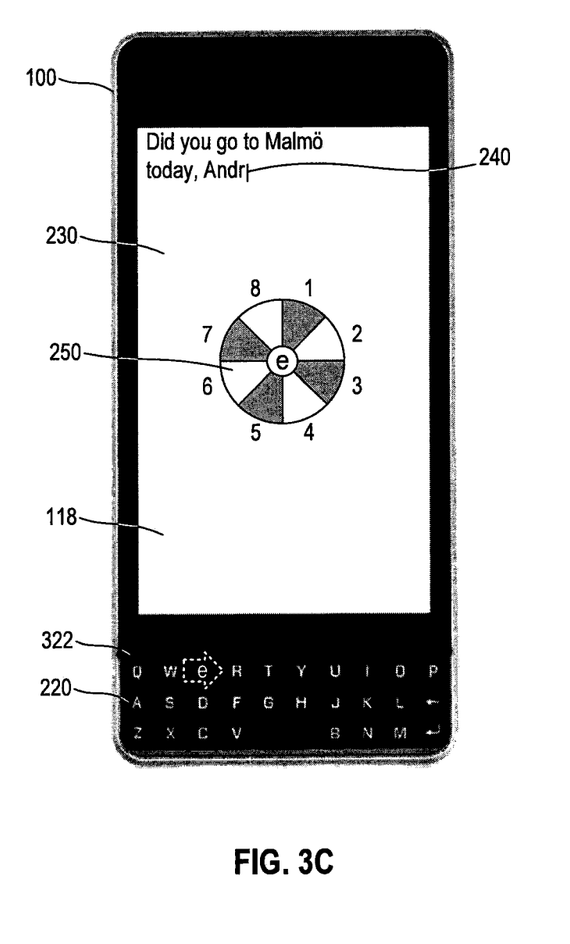
Figure 3D:
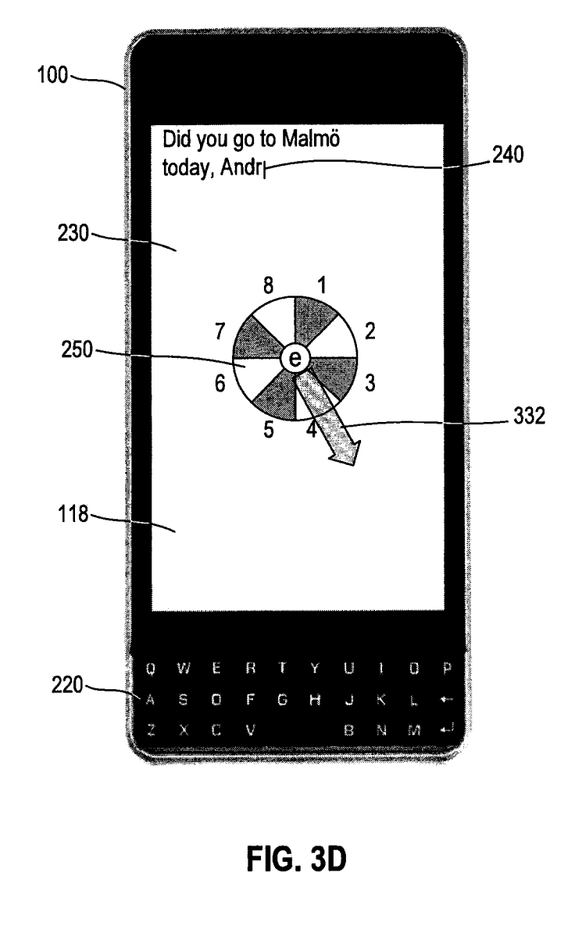
Figure 3E:
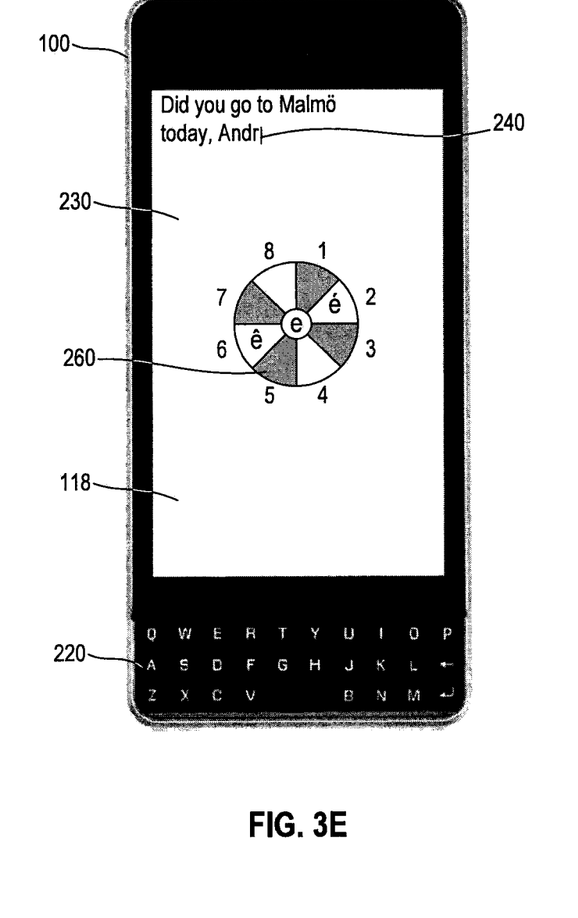
Figure 3F:
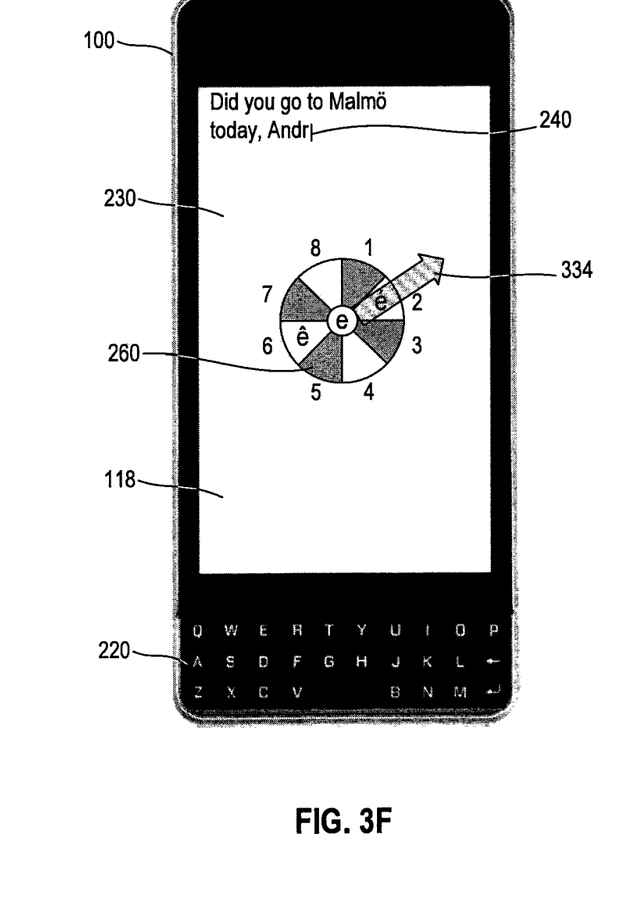
Figure 3G:
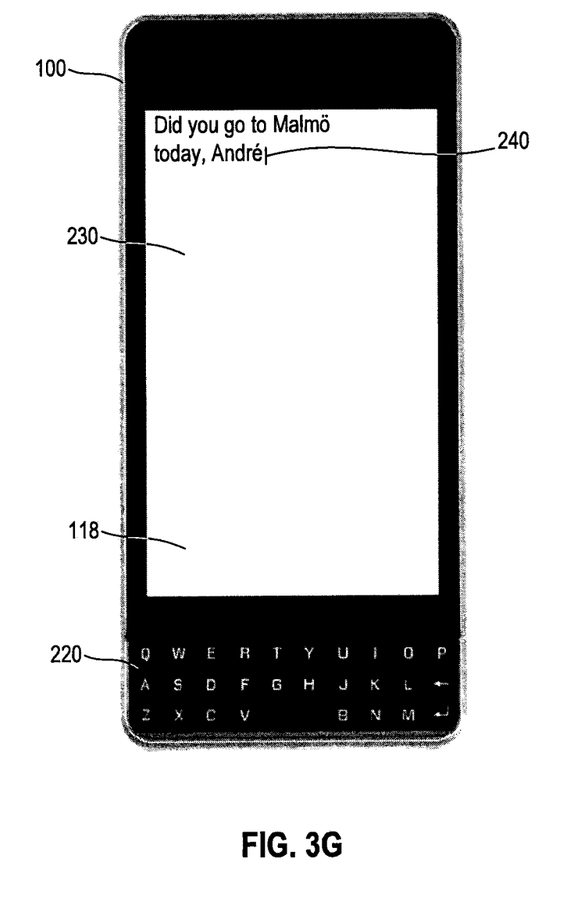

In the example shown in FIGS. 3A-3G, the user now wishes to enter the French character "é" to complete the entry of the name "André." FIGS. 3B-3G depict the same entry process as described in FIGS. 2B-2G. In this example, the user enters the language variant character entry module via a swipe gesture 322 on the "base" character "e." See FIG. 3B. Menu 250 then appears in FIG. 3C. In this example, the user desires to input a language variant character associated with the French language character set, which here has been assigned to position 4 within menu 250. In FIG. 3D, the user performs a directional swipe gesture 332 towards position 4 to select the French language character set. In FIG. 3E, menu 260 appears, showing various language variant characters associated with base character "e" and associated with the French language character set. It can be seen that the desired character "é" is assigned to position 2 of menu 260. In FIG. 3F, the user makes a directional swipe gesture 334 towards position 2 of menu 260, selecting the language variant character "é." Finally, in FIG. 3G, the character is displayed on viewing pane 230 of touchscreen 118 to the left of cursor 240.

It can be readily recognized that the examples shown in FIGS. 2A-2G and FIGS. 3A-3G can be extended to select any character associated with any language, depending on the language character sets available to electronic device 100. Language character sets are made available via a device configuration process, which will now be described.

Figure 4:
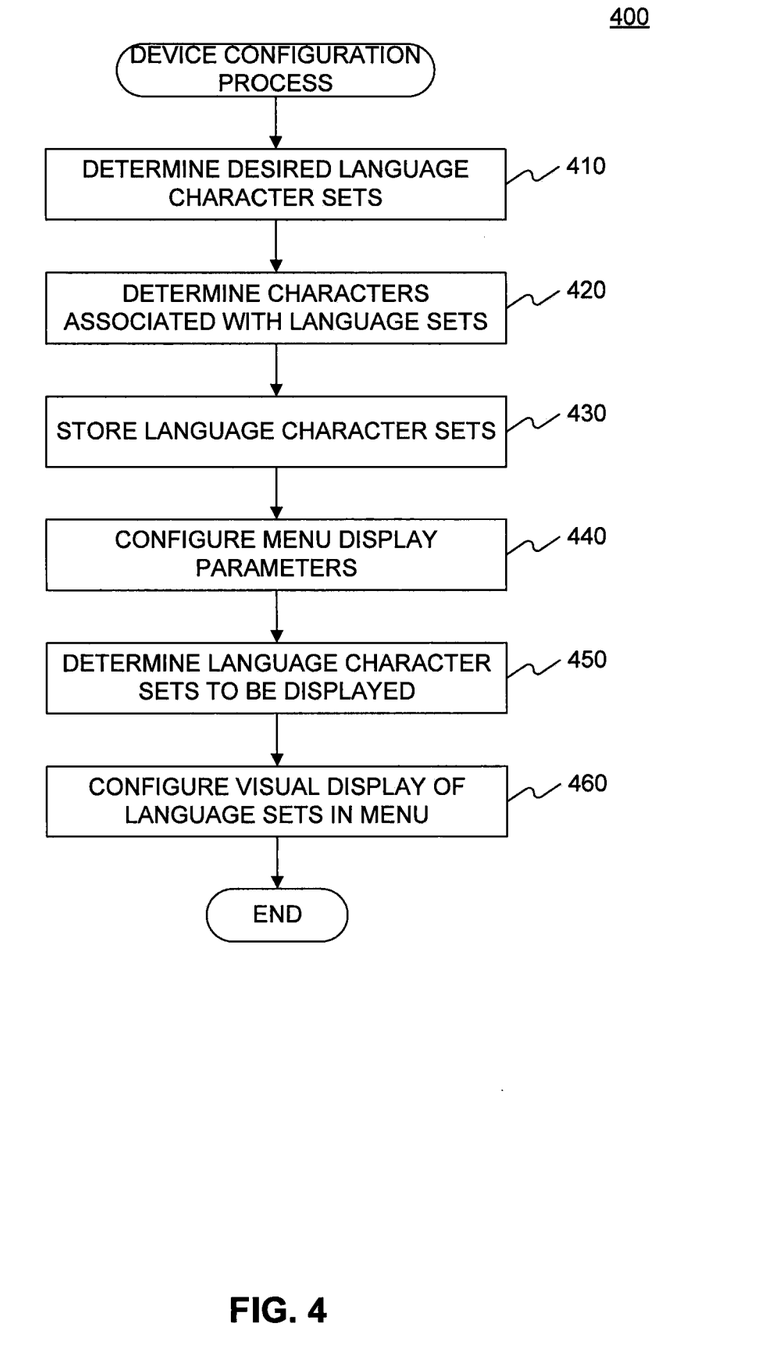
FIGS. 4-5 are flow charts showing example device configuration and device operation processes, consistent with embodiments disclosed herein.

Referring to FIG. 4, in some example embodiments a device configuration process 400 may be performed, consistent with example embodiments disclosed herein.

In one embodiment, electronic device 100 may determine a plurality of desired words and characters associated with languages to be incorporated into memory 110 for user selection (Step 410). One or more language character sets may be available for incorporation into memory 110 depending on a number of factors, including but not limited to where the device is sold, where the device is made, and the nationality of the user. The desired language character set selection may be performed by the device manufacturer at the time of device assembly, by a user after purchase, or by an intermediate third party, such as a retailer, merchant, or service provider.

Electronic device 100 may further determine the specific characters associated with the desired language character sets (Step 420). In some embodiments, the characters associated with the desired language character sets may be predetermined, and loaded into memory 110 via physical storage devices, such as flash memory, SD cards, portable memory, etc. In some embodiments, the characters may be loaded into memory 110 via a direct connection to a remote computer or other processor. In some embodiments, the characters may be loaded into memory 110 via network 150. In some embodiments, the user may be able to vary the characters associated with a given language, and either add to or subtract from the set of characters.

The desired language character sets, along with the associated characters, may be stored by electronic device 100 within memory 110 (Step 430). Alternatively, the language character sets may be readable by electronic device 100 over network 150. The data sets may be stored in a database located in memory 110, or alternatively, may access a remote database over network 150. In one embodiment, the data sets may be accessed and re-downloaded periodically from a central remote file server by electronic device 100. The data sets may be updated as part of firmware or software upgrades.

Electronic device 100 may configure display parameters associated with menus 250 and 260 (Step 440). These parameters may include the respective shapes of menus 250/260, where menus 250/260 are displayed on viewing pane 230 and touchscreen 118, and the size of menus 250/260. In some embodiments, the display parameters in Step 440 may include how the various languages are visually represented in menu 250, as described previously with respect to FIG. 2. For example, electronic device 100 may configure the languages to be displayed as abbreviations. In other embodiments, electronic device 100 may configure the languages to be displayed as national flags. In some embodiments, various display parameters for menus 250/260 may be permanently set. In some embodiments, various display parameters for menus 250/260 may be presented to the user for user preference selection.

Electronic device 100 may determine the subset of available languages that will be displayed on menu 250 (Step 450). The subset of languages that will be made available for user selection may be determined by the manufacturer, by the user, or by a third party, such as a retailer, merchant, or service provider. The subset of languages that will be made available for user selection may be updated at a later time by the user, or may for example be dynamically updated by electronic device 100. For example, positioning system 136 may determine via network 150 that electronic device 100 is being operated in a particular country or geographical region, and the subset of languages that will be made available for user selection may change based on that determination.

Electronic device 100 may configure the contents of menus 250 and 260 (Step 460). In some embodiments, the desired languages to be made available for user selection may be assigned to specific positions on menu 250. Menu positions are persistent regardless of the selected character, taking advantage of motor learning (also referred to as muscle memory) that results from repeated use of the user interface to select among language variants for the selected character.

Figure 5:
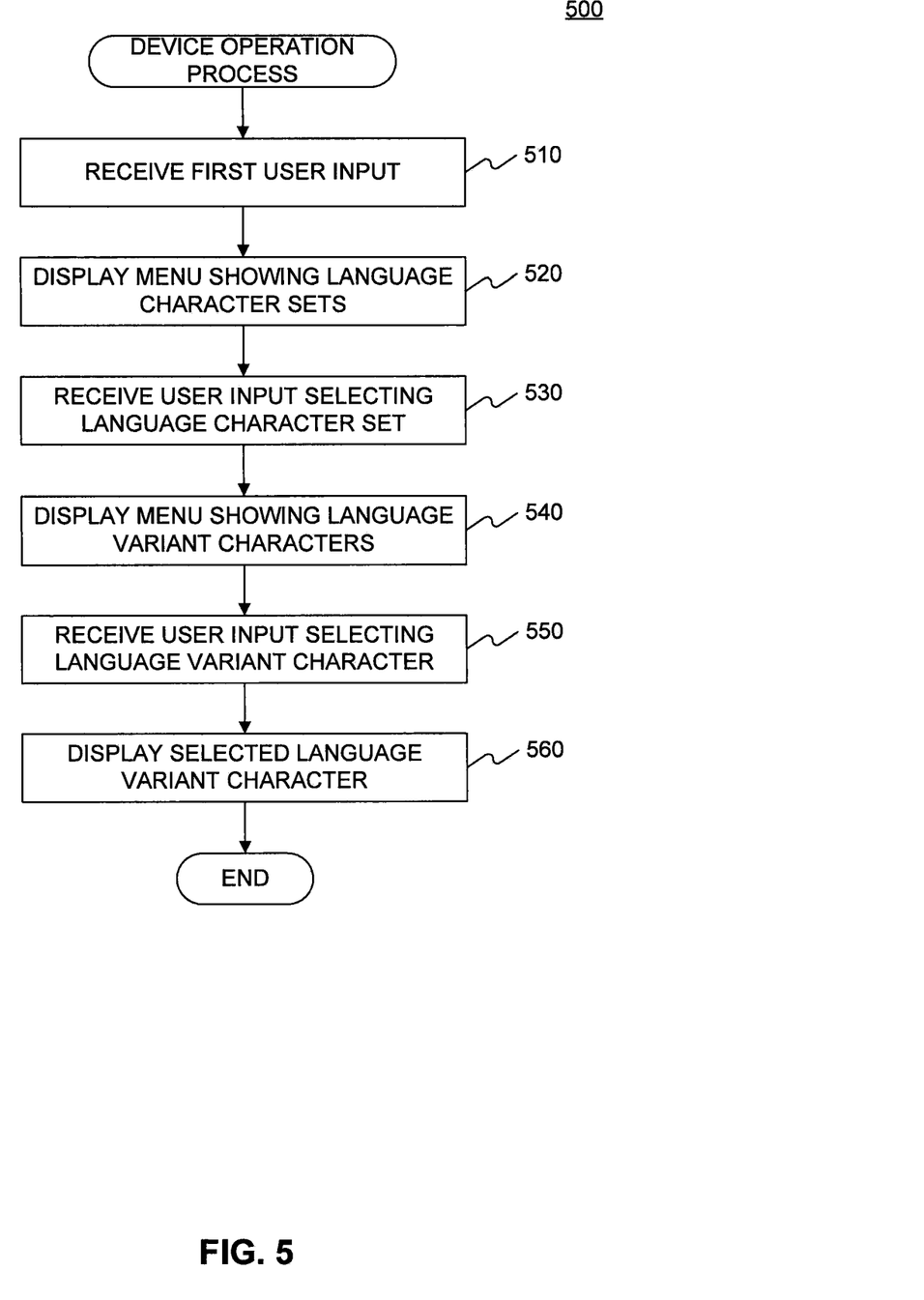

Referring to FIG. 5, in some example embodiments a device operation process 500 may be performed, consistent with example embodiments disclosed herein.

Electronic device 100 may receive a first user input of a character, along with an indication that a language variant character is desired (Step 510). As described previously in association with FIGS. 2-3, a user may indicate a desire to enter a language variant of the character in various ways. In some embodiments, a swipe gesture may be made on keyboard 220. A skilled artisan may envision various means of indicating a desire to enter language variant characters.

Electronic device 100 may display a first menu to assist the user in selecting a desired language character set (Step 520). As an example, this menu may be menu 250. Menu 250 may be previously configured, through device configuration process 400, to display on the screen a plurality of possible language character sets for selection. The language character sets are permanently assigned to specific positions within menu 250. As previously described, visual representation of the language character sets within menu 250 may occur in a variety of ways, such as full names of languages, abbreviations of languages and/or associated countries or geographical regions, and graphic representations, such as national flags, or shapes of countries.

Electronic device 100, via keyboard 220, may receive a second input from the user indicating which language is desired for language variant character input (Step 530). In some embodiments, the input is a directional swipe, directed towards the position of the language indicia within menu 250. In some embodiments, the input is a tap, press, or hard press on a key of keyboard 220 associated with the language desired for selection.

Electronic device 100 may display a second menu to assist the user in selecting a desired language variant character (Step 540). As an example, this menu may be menu 260. Menu 260 may be previously configured, through device configuration process 400, to display on the screen a plurality of possible language variant characters associated with both the language selected in Step 530 and the "base" character selected in Step 510 for selection. The language variant character selection candidates are assigned to specific positions within menu 260.

Electronic device 100, via keyboard 220, may receive a third input from the user indicating which language variant character is desired for selection (Step 550). In some embodiments, the input is a directional swipe, directed towards the position of the language variant character indicia within menu 260. In some embodiments, the input is a tap, press, or hard press on a key of keyboard 220 associated with the language variant character desired for selection. Electronic device 100 may display the selected language variant character in viewing pane 230 of touchscreen 118 (Step 560).

Other embodiments of the invention will be apparent to those skilled in the art from consideration of the specification and practice of the invention disclosed herein. It is intended that the specification and examples be considered as examples only, with a true scope and spirit of the invention being indicated by the following claims.

What is claimed is:

1. A method for inputting characters in a mobile communication device having a display, a keyboard and a memory, the method comprising:
   receiving a first input of a character;
   in response to the first input, displaying available language character sets associated with the character at a position in a first menu;
   receiving a second input reflecting a first directional swipe toward a position of a particular language character set on the first menu;
   in response to the second input, displaying available language variant characters associated with the character and the particular language character set at a position in the first menu, the available language variant characters replacing the available language character sets associated with the character in the first menu;
   receiving a third input reflecting a second directional swipe toward a position of a particular language variant character on the first menu; and
   in response to the third input, outputting the particular language variant character as a selected character.

2. The method of claim 1, further comprising:
   associating each of at least two of the language character sets in the memory with a particular position on the first menu.

3. The method of claim 1, wherein displaying the available language character sets associated with the character at the position in the first menu is determined from a persistent association between a plurality of the available language character sets and positions on the first menu.

4. The method of claim 1, wherein displaying available language character sets comprises depicting possible language character set selection candidates on the first menu by the name of the language.

5. The method of claim 1, wherein displaying available language character sets comprises depicting possible language character set selection candidates on the first menu as visual representations of national flags.

6. The method of claim 1, wherein displaying available language character sets comprises depicting possible language character set selection candidates on the first menu as abbreviated names of countries.

7. The method of claim 1, wherein displaying available language character sets comprises depicting possible language character set selection candidates on the first menu as abbreviated names of languages.

8. The method of claim 1, wherein displaying available language character sets comprises depicting possible language character set selection candidates on the first menu as visual representations of countries.

9. The method of claim 1, wherein the first menu is presented visually as a circle or a polygon.

10. A mobile communication device having a display and a keyboard, comprising:
    a memory containing:
       a plurality of character sets associated with languages, each language character set having language variant characters; and
       a set of instructions; and
    one or more processors configured to execute the instructions to:
       receive a first input of a character;
       in response to the first input, display available language character sets associated with the character at a position in a first menu;
       receive a second input reflecting a first directional swipe toward a position of a particular language character set on the first menu;
       in response to the second input, display available language variant characters associated with the character and the particular language character set at a position in the first menu, the available language variant characters replacing the available language character sets associated with the character in the first menu;
       receive a third input reflecting a second directional swipe toward a position of a particular language variant character on the first menu; and
       in response to the third input, output the particular language variant character as a selected character.

11. The mobile communication device of claim 10, wherein the processor is further configured to execute the instructions to:
    associate each of at least two of the language character sets in the memory with a particular position on the first menu.

12. The mobile communication device of claim 10, wherein displaying the available language character sets associated with the character at the position in the first menu is determined from a persistent association between a plurality of the available language character sets and positions on the first menu.

13. The mobile communication device of claim 10, wherein displaying available language character sets comprises depicting possible language character set selection candidates on the first menu by the name of the language.

14. The mobile communication device of claim 10, wherein displaying available language character sets comprises depicting possible language character set selection candidates on the first menu as visual representations of national flags.

15. The mobile communication device of claim 10, wherein displaying available language character sets comprises depicting possible language character set selection candidates on the first menu as abbreviated names of countries.

16. The mobile communication device of claim 10, wherein displaying available language character sets comprises depicting possible language character set selection candidates on the first menu as abbreviated names of languages.

17. The mobile communication device of claim 10, wherein displaying available language character sets comprises depicting possible language character set selection candidates on the first menu as visual representations of countries.

18. The mobile communication device of claim 10, wherein the first menu is presented visually as a circle or a polygon.

19. A non-transitory computer-readable storage medium with an executable program stored thereon, wherein the program instructs a microprocessor to:
    receive a first input of a character;
    in response to the first input, display available language character sets associated with the character at a position in a first menu;

receive a second input reflecting a first directional swipe toward a position of a particular language character set on the first menu;

in response to the second input, display available language variant characters associated with the character and the particular language character set at a position in the first menu, the available language variant characters replacing the available language character sets associated with the character in the first menu;

receive a third input reflecting a second directional swipe toward a position of a particular language variant character on the first menu; and in response to the third input, output the particular language variant character as a selected character.

20. The computer-readable storage medium of claim 19, wherein displaying the available language character sets associated with the character at the position in the first menu is determined from a persistent association between a plurality of the available language character sets and positions on the first menu.

* * * * *